US008677275B2

(12) United States Patent
Moody et al.

(10) Patent No.: US 8,677,275 B2
(45) Date of Patent: *Mar. 18, 2014

(54) ILLUSTRATING A MENU OF INSIGHTS ASSOCIATED WITH VISUALIZATIONS

(75) Inventors: Paul B. Moody, Hyde Park, VT (US); Cynthia L. Ice, Maynard, MA (US); Douglas W. Conmy, Nashua, NH (US); Mary Elizabeth Raven, Merrimack, NH (US); Judi L. Coppinger, Merrimack, NH (US); Francis D. Bermingham, Groton, MA (US); Ram Krishnamurthy, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/006,364

(22) Filed: Jan. 13, 2011

(65) Prior Publication Data

US 2011/0113375 A1 May 12, 2011

Related U.S. Application Data

(63) Continuation of application No. 10/745,500, filed on Dec. 29, 2003, now Pat. No. 7,900,160.

(51) Int. Cl.
*G06F 3/048* (2013.01)
(52) U.S. Cl.
USPC ........... 715/825; 715/752; 715/810; 715/817; 715/827; 709/206
(58) Field of Classification Search
USPC ........... 715/752, 810, 817, 825, 827; 709/206
See application file for complete search history.

(56) References Cited

U.S. PATENT DOCUMENTS

| 4,823,283 | A | 4/1989 | Diehm et al. ................. 364/518 |
|---|---|---|---|
| 5,544,360 | A | 8/1996 | Lewak et al. ................. 395/600 |
| 5,615,367 | A | 3/1997 | Bennett et al. ............... 395/613 |
| 5,625,783 | A | 4/1997 | Ezekiel et al. ............... 395/352 |
| 5,644,738 | A | 7/1997 | Goldman et al. ............. 395/352 |
| 5,664,133 | A | 9/1997 | Malamud et al. ............ 345/352 |
| 5,813,009 | A | 9/1998 | Johnson et al. .............. 707/100 |
| 5,874,953 | A | 2/1999 | Webster et al. .............. 345/329 |
| 5,895,470 | A | 4/1999 | Pirolli et al. ................. 707/102 |
| 5,899,995 | A | 5/1999 | Millier et al. ................ 707/102 |
| 5,948,058 | A | 9/1999 | Kudoh et al. ................ 709/206 |
| 6,009,442 | A | 12/1999 | Chen et al. ................... 707/522 |
| 6,088,696 | A | 7/2000 | Moon et al. .................... 707/10 |
| 6,182,091 | B1 | 1/2001 | Pitkow et al. ................ 707/501 |
| 6,356,922 | B1 | 3/2002 | Schilit et al. ................ 707/512 |
| 6,396,513 | B1 | 5/2002 | Helfman et al. ............. 345/752 |
| 6,424,995 | B1 | 7/2002 | Shuman ....................... 709/206 |

(Continued)

OTHER PUBLICATIONS

Venolia, Gina, et al., "Understanding Sequence and Reply Relationships Within Email Conversations: A Mixed-Model Visualization", *CHI 2003: New Horizons*, vol. No. 5, Issue No. 1, Ft. Lauderdale, Florida, Apr. 5-10, 2003, 8 pages.

*Primary Examiner* — Robert Stevens
*Assistant Examiner* — Eric Wiener
(74) *Attorney, Agent, or Firm* — Cuenot, Forsythe & Kim, LLC

(57) ABSTRACT

A system and method are provided for generating one or more menus having options that display insights from visualizations. The options presented in the menus enable users to determine relationships between elements of the visualization. The relationships may be displayed textually to enable user to navigate the menus using a keyboard, a text-to-voice converter, and/or pointers.

16 Claims, 4 Drawing Sheets

(56) References Cited

U.S. PATENT DOCUMENTS

| | | | |
|---|---|---|---|
| 6,466,941 B1 | 10/2002 | Rowe et al. | 707/102 |
| 6,571,234 B1 | 5/2003 | Knight et al. | 707/3 |
| 6,615,241 B1 | 9/2003 | Miller et al. | 709/203 |
| 6,630,944 B1 | 10/2003 | Kakuta et al. | 345/758 |
| 6,658,409 B1 | 12/2003 | Nomura et al. | 707/4 |
| 6,708,205 B2 | 3/2004 | Sheldon et al. | 709/206 |
| 6,725,228 B1 | 4/2004 | Clark et al. | 707/102 |
| 6,732,155 B2 | 5/2004 | Meek | 709/206 |
| 6,792,448 B1 | 9/2004 | Smith | 709/204 |
| 6,820,094 B1 | 11/2004 | Ferguson et al. | 707/200 |
| 6,832,245 B1 | 12/2004 | Isaacs et al. | 709/206 |
| 6,847,387 B2 | 1/2005 | Roth | 345/811 |
| 6,941,321 B2 | 9/2005 | Schuetze et al. | 707/103 R |
| 7,035,903 B1 | 4/2006 | Baldonado | 709/206 |
| 7,120,625 B2 | 10/2006 | Kagimasa et al. | 707/3 |
| 7,143,110 B2 | 11/2006 | Tomari et al. | 707/104.1 |
| 7,237,009 B1 | 6/2007 | Fung et al. | 709/206 |
| 7,421,690 B2 | 9/2008 | Forstall et al. | 718/100 |
| 2001/0042087 A1 | 11/2001 | Kephart et al. | 707/530 |
| 2002/0126146 A1 | 9/2002 | Burns et al. | 345/752 |
| 2004/0015548 A1 | 1/2004 | Lee | 709/204 |
| 2004/0044735 A1 | 3/2004 | Hoblit | 709/206 |
| 2004/0054737 A1 | 3/2004 | Daniell | 709/206 |
| 2004/0088359 A1 | 5/2004 | Simpson | 709/206 |
| 2005/0135681 A1 | 6/2005 | Schirmer | 382/229 |
| 2005/0138552 A1 | 6/2005 | Venolia | 715/526 |
| 2005/0144573 A1 | 6/2005 | Moody et al. | 715/825 |

ILLUSTRATING A MENU OF INSIGHTS ASSOCIATED WITH VISUALIZATIONS

RELATED APPLICATIONS

The present application is a continuation of U.S. patent application Ser. No. 10/745,000, entitled "SYSTEM AND METHOD FOR ILLUSTRATING A MENU OF INSIGHTS ASSOCIATED WITH VISUALIZATIONS," and filed Dec. 29, 2003, now U.S. Pat. No. 7,900,160 which is hereby incorporated by reference in its entirety into the present application.

FIELD OF THE INVENTION

The invention is directed to a system and method for generating menus and/or menu items that provide insights derived from visualizations associated with computer applications.

BACKGROUND OF THE INVENTION

Modern computer applications provide sighted users with increasingly sophisticated visualizations of information through graphical user interfaces (GUI). The visualizations enable ease of navigation for sighted users having full facility of a pointing device, such as a computer mouse. The computer mouse may be used to intuitively interact with the visualization. As a result, sighted users may quickly navigate through visualizations by clicking on various features illustrated in the visualizations.

For example, in an email application, sighted users may discern relationships among various email messages based on viewing information in the visualizations, such as subject lines of the email messages. In other situations, sighted users may discern relationships among various email messages based on thread groupings illustrated in the visualizations.

These benefits associated with sophisticated visualizations of information are not available to users that are unable to visually inspect the GUI (non-sighted users). Such non-sighted users may be restricted to using keyboard commands to navigate through applications rather than using pointing devices to navigate through the visualizations. Alternatively, non-sighted users may rely on screen readers to recite textual words displayed on the GUI.

For non-sighted users, applications may recite options based on requests by non-sighted users for the computer to read aloud the menus and/or menu items displayed in the GUI. The applications may literally recite each menu and/or menu item that is selected, such as, File, Edit, View, and Create. The non-sighted user may respond by reciting or entering an appropriate command to select a menu and/or menu item. Typically, non-sighted users do not speak the command. Rather, each command may be associated with a number and non-sighted users may use the keyboard to enter the number that corresponds with the selected menu and/or menu item. The application may then recite a selection of options associated with the selected menu and/or menu item. As a result, non-sighted users are provided with options based on lists of menus and/or menu items that do not include relationships discovered from viewing information in visualizations, such as subject lines of email messages. Other drawbacks exist.

In another example, sighted users may be able to view a list of email messages and quickly identify which of the list of email messages are replies to an email message that originated from a particular user. In contrast, non-sighted users may be presented with a listing of received email messages, wherein the email messages are provided in order of receipt. As a result, non-sighted users are not able to identify which of the list of email messages are replies to an email message that originated from a particular user. Various other drawbacks exist.

Other drawbacks exist with these and other known systems.

SUMMARY

Various aspects of the invention overcome at least some of these and other drawbacks of existing systems. According to one embodiment, the system comprises an email based system architecture. The system comprises a number of client terminals, each of which may be coupled to one or more servers (e.g., via a wired, wireless, and/or combination of wired and wireless connection).

Each of the client terminals preferably includes at least a processor, a display, and at least one input mechanism (e.g., keyboard or other input mechanism). Preferably, each client terminal includes an email program or the ability to access an email account via a network (e.g., the Internet). Other applications may reside on the client terminal, as desired.

The software has various purposes. For convenience, each of the related sets of functions performed by the software will be referred to as modules. These modules may be part of a single program or a collection of related components that operate together. In some cases, not all modules will need to be used or are desired to be used. The software is purposefully designed to be flexible to permit modules to be added. Certain functions and features are enabled via a client side software that is loaded onto the client terminals. Other functions and features may be performed by software resident on server side software.

By way of example, the client side software may include one or more of the following (and other) modules.

A user interface module may be provided to enable a user to interact with the application and to provide the display of various elements (e.g., email messages) and other information, tools and other options to the user.

A relationship module may be provided to analyze criteria associated with elements to determine one or more relationships that exist among the various elements.

A menu generating module may be provided to generate one or more menus and/or menu items that display insights from the visualizations, wherein insights may be derived from the relationships determined by the relationship module.

A memory module may be configured to be in communication with one or more of the user interface module, the relationship module, and the menu generating module.

Visualizations may include all information that sighted users may discover from viewing an application interface. For example, visualizations may include inferences, insights, and other visualizations that may be discovered from the user interface or other representations of the application interface.

The "elements" may include various types of elements and other information. Each element may include other elements. According to one embodiment, elements may include one or more email messages.

The user interface module may enable a user to view a listing of elements (e.g., email message). The user interface module also may enable the user to select the element in order to cause the contents of the element to be displayed in a presentation area.

According to one aspect of the invention, the client side email system may enable display of an Access drop down menu having options that provide insights regarding underlying information for the selected elements. The options may include textual representations of visualizations that sighted users may infer from the application interface. Access drop down menu may present a hierarchical menu of options that the user may navigate. According to another aspect of the invention, Access drop down menu may include one or more levels of options.

According to yet another aspect of the invention, the one or more levels of options may include a submenu that present qualities associated with the selected element of the menu. For example, the submenu may list family members of the selected element and may include commands that enable the user to review the selected element. According to one aspect of the invention, each level of the menu may provide textual representations of the visualization. Furthermore, the menu may present information that may be read out loud to the user and may enable the user to navigate the menu, wherein the user may navigate the various menus and/or menu levels using a keyboard.

According to another aspect of the invention, options presented in Access drop down menu may enable users to determine which elements are related to other elements. Access drop down menu may textually illustrate relationships between elements that are otherwise represented graphically through a thread. Menu options also may include attributes associated with selected elements, such as which elements may contain attachments, which elements may be unread, or other attributes.

The invention provides users with an ability to view and navigate menus and/or menu items derived from visualizations, wherein the menus and/or menu items include representations of relationships between elements.

In threaded representations of elements, consecutively positioned elements may attain their position from being received next in time or based on sharing a particular relationship. For the case where the elements are positioned consecutively based on sharing a particular relationship, these elements may otherwise have been separated by a plurality of elements if the listing was based on time of receipt. According to one aspect of the invention, a menu system is provided for displaying threaded representations using textual menus. The invention enables users to navigate elements based on time sequence and/or relationship sequence (e.g., parent, child, grandchild, etc.). Navigating elements based on the relationship sequence enables the time associated with when the element was created and/or received to be compressed, so that elements received weeks apart may be illustrated next to one another. Additionally, users may navigate elements based on attribute states, such as next unread, those with attachments, among other attribute states.

In one aspect of the invention, the system may concurrently display the visualization and the menu system. The menu system may provide many of the insights of the visualization, as well as some of the navigational conveniences available via a pointing device. The structure of the menu may include options for displaying key insights of the visualization. The menu options may be made available to the screen reader. Furthermore, the structure of the menu may provide navigation options that may be available through the use of pointers.

The invention may provide a hierarchical menu structure that enables access to an underlying data model used in the visualization and provides a way to include insights into the hierarchical menu structure (e.g., the number of elements that are unread). The hierarchical menu structure may be presented with options that represent insights (e.g., number of unread, initial message, most recent message) and provide options for navigating a current context (e.g., previous related message, next related messages).

The invention has numerous advantages over and avoids many drawbacks of prior systems. The invention enables display of visualizations in a menu structure. The invention enables generation of menus having options that enable textual representations of visualizations. The invention enables users to determine relationships between elements and to display the relationships in a hierarchical menu.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below.

DETAILED DESCRIPTION

Figure 1:
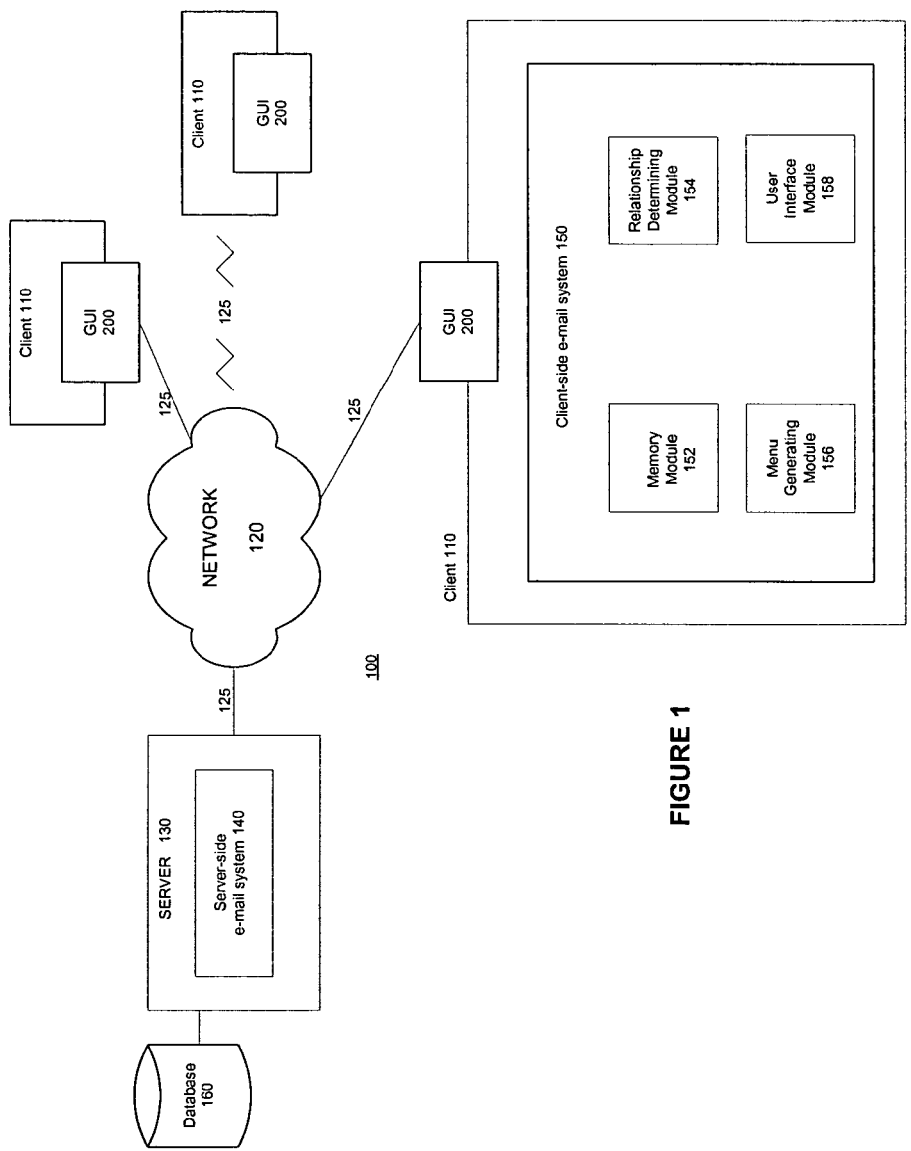
FIG. 1 illustrates an exemplary embodiment of a system diagram according to an embodiment of the invention.

FIG. 1 illustrates an example of a system architecture 100 according to one embodiment of the invention. System 100 may include one or more client terminals 110 and one or more servers 130 that may be connected via a wired network, a wireless network, a combination of the two, and/or other networks. The one or more client devices 110 may include personal computers, personal digital assistants, cell phones, kiosks, portable computers, workstations, dumb terminals, Blackberry™, Palm Pilot™, web-enabled mobile phones, or other types of client devices. The one or more networks may include the Internet, an intranet, a Personal Area Network (PAN), a Local Area Network (LAN), a Wide Area Network (WAN), a Metropolitan Area Network (MAN), or other networks.

Server 130 may be coupled to an external network 120 (for example, the Internet) through firewalls, routers, or other switching device (not illustrated). The terms "client" and "server" are used to refer to a computer's general role as a requester of data (the client) or provider of data (the server). The system of FIG. 1 is provided for illustrative purposes only and should not be considered a limitation of the invention. Other configurations may be used.

According to an embodiment of the invention, system 100 may be configured to generate menus that provide insights to users (e.g., both nonsighted and sighted), wherein the menus are derived from visualizations associated with corresponding computer applications. In one embodiment of the invention, the menus may be textual menus. While the following disclosure is directed to email applications, the concepts and features described herein should not be restricted to email applications. Rather, the concepts and features described herein may be broadly applied to any number of other computer applications. For example, the concepts and features described herein may be broadly applied to any number of other computer applications that use sophisticated visualizations to provide insights into the represented data.

According to an embodiment of the invention, an e-mail system is provided to include a server-side e-mail system 140 that may be stored on, loaded on to, and/or operated by server 130 and a client-side e-mail system 150 that may be stored on, loaded on to, or operated by a remote client 110. Server-side e-mail system 140 and client side email system 150 may be used to transmit and/or receive one or more e-mail messages from predetermined network nodes.

According to one embodiment of the invention, the e-mail system described herein may comprise a stand-alone e-mail system. Alternatively, the e-mail system may be incorporated into a number of products relating to e-mail, instant messaging, discussion forums, or other multi-part communication systems or platforms. As an exemplary illustration, one or more of the features and functionality of the e-mail system described herein may be incorporated into the Lotus Workplace™ 2.0 platform.

According to another embodiment of the invention, server 130 may be or may include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform. According to another embodiment of the invention, server-side e-mail system 140 may perform various functions including processing e-mail messages, routing e-mail messages, or other functions. Server-side e-mail system 140 also may manage administrative tasks relating to security, creation and maintenance of user e-mail accounts, or other administrative tasks. Furthermore, known server-side e-mail capabilities and/or functionality may be enabled by server-side e-mail system 140, as known and understood by those having skill in the art.

As illustrated in FIG. 1, one or more data sources 160 may be operatively coupled to server 130 and/or server-side e-mail system 140. Data source 160 may store e-mail messages, user e-mail account information, or other information. Data source 160 may comprise any combination of databases and other data storage or query formats, platforms, or resources. Examples of databases may include the Oracle™. relational database sold commercially by Oracle Corporation, as well as Informix™. and DB2 (Database 2). Other databases may also be used. Examples of additional data storage or query formats, platforms, or resources, may include a knowledge management (KM) repository, a search engine, OLAP (On Line Analytical Processing), SQL (Standard Query Language), a SAN (storage area network), and Microsoft Access™. Other data sources may also be used, incorporated, or accessed into the invention.

According to an embodiment of the invention, one or more remote clients 110 may be coupled over a network 120 to server 130 via communication links 125. Communication links 125 may include wired; wireless, or optical fiber, among other transmission mediums. Communication links 125 may include any one or more of Internet lines, intranet lines, copper telephone lines, Digital Subscriber Line (DSL) connections, Digital Data Service (DDS) connections, Ethernet connections, Integrated Services Digital Network (ISDN) lines, analog modem connections, cable modem connections, wireless connections, and/or other communication links.

According to an embodiment of the invention, client-side e-mail system 150 may serve as a "front-end," enabling users at clients 110 to read email messages, compose email messages, send email messages, organize e-mail messages (both sent and received) in various folders and/or sub-folders, maintain address books, launch programs to view e-mail message attachments, access additional e-mail features and functionality, and perform other features, as known and understood by those having skill in the art. In operation, one or more users may access the various features and functionality enabled by client-side e-mail system 150 and/or server-side e-mail system 140 through an interface. According to an embodiment of the invention, interface may comprise a graphical user interface (GUI) 200.

As illustrated in FIG. 1, client-side e-mail system 150 may include one or more modules, such as a memory module 152, a menu generating module 154, a relationship determining module 156, and a user interface module 158. Each of the foregoing modules may implement the various features and functions of the invention as described herein. Additional modules may be provided. One or more of the modules may be combined. For some purposes, not all modules or data storage structures may be necessary. Those having skill in the art will readily appreciate that the invention described herein may operate under various system configurations.

According to an alternate embodiment of the invention, one or more of memory module 152, relationship determining module 154, menu generating module 156, and user interface module 158 may be associated with server-side e-mail system 140.

Memory module 152 may be in communication with one or more of relationship determining module 154, menu generating module 156, and user interface module 158 to enable storage and/or sharing of data. Memory module 152 may be implemented using software and/or hardware devices. For example, memory module 152 may include magnetic disk storage drives, optical disk storage drives, random access memory, and other memory modules.

Relationship module 154 may be provided to analyze criteria associated with elements (e.g., email messages), such as, threads, ancestral origins, and other criteria, to determine one or more relationships that exist among the various elements. According to an embodiment of the invention, relationship module 154 may detect thread identifications associated with selected elements and may organize the elements based on these thread identifications.

Menu generating module 156 may be provided to generate one or more menus that display insights from the visualizations. According to one embodiment of the invention, the insights may be derived at least from the relationships determined by the relationship module 154. The one or more menus may include a hierarchical menu structure. According to another embodiment of the invention, the one or more menus may include menu items that are organized to enable easy navigation.

User interface module 158 may be provided to enable users to interact with client side email system 150 and to display the data elements, tools and other features to users.

Figure 2:
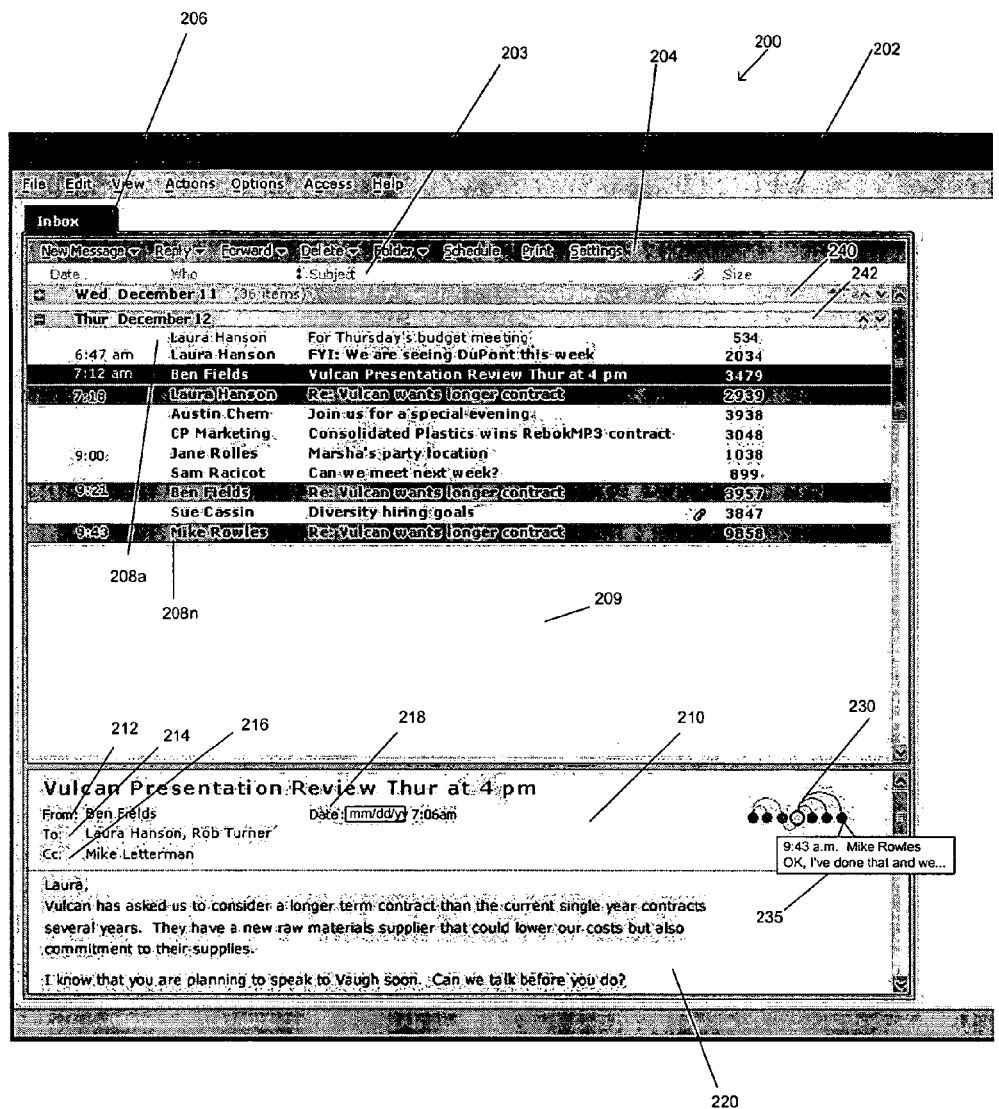
FIG. 2 illustrates an exemplary screen-shot of the application user interface according to an embodiment of the invention.

FIG. 2 illustrates an exemplary layout of client side email system GUI 200 that may be associated with a corresponding email application. Upon launching the email application, client side email system GUI 200 may be presented to the user.

If the user is operating on-line, the client side email system 150 may communicate with the server side email system 140 upon launching of the email application. According to an embodiment of the invention, client side email system 150 may perform various functions. For example, client side email system 150 may initiate sending and/or receiving email messages, among other functions. According to another embodiment of the invention, server side email system 140 may perform various functions. For example, server side email system 140 may initiate sending and/or receiving email messages, among other functions.

Client side email system GUI 200 may include one or more toolbars (202) and one or more panes (206) that illustrate several aspects and features of the email application. According to one embodiment, client side email system GUI 200 may include one or more components, such as various panes, toolbars, and other components. For example, email system GUI 200 may include at least Inbox pane 206. Other panes may be provided.

Toolbar 202, associated with client side email system GUI 200, may include various buttons that provide pull down menus for enabling several operations to be performed by the email application. For example, toolbar 202 may include buttons for File, Edit, View, Actions, Options, Access and Help operations, among other operations.

Inbox pane 206, associated with client side email system GUI 200, may include one or more portions, such as an inventory portion 209 and a presentation portion 210, among other portions. Inventory portion 209 may be provided to organize and display elements 208a-208n, while presentation portion 210 may be provided to display content and other information associated with selected elements 208a-208n.

According to one embodiment of the invention, inventory portion 209 may include toolbar 204, which has several buttons (or other icons) for performing various operations associated with the elements 208a-208n. For example, toolbar 204 may include operations that enable creating a new email message, replying to an email message, forwarding an email message, deleting an email message, assigning email message to a folder, creating a schedule, printing an email, adjusting setting and/or other operations.

According to another embodiment of the invention, inventory portion 209 may include elements that are organized and displayed based on criteria, such as date of receipt, among other criteria. For example, as illustrated by date bar 242, elements 208a-208n may correspond to elements that were received on Thursday, December 12. Furthermore, as illustrated by date bar 240, inventory portion 209 may be configured to display elements that were received on Wednesday, December 11. Inventory portion 209 may be configured to simultaneously display any number of date bars. Other types of bars may be created for displaying the elements. For example, inventory portion may be configured to organize elements based on the person that created the element, among other criteria.

In yet another embodiment of the invention, inventory portion 209 may be configured to enable users to specify a format for displaying elements 208a-208n. For example, elements 208a-208n may be displayed according to parameters that include columns for a date, who, a subject, an attachment, a file size, and other parameters, as illustrated in options bar 203. Elements 208a-208n may be organized and/or searched according to these parameters. A selected element 208a-208n may be designated by highlighting or some other distinguishing feature.

According to an embodiment of the invention, inbox pane 206 may include presentation portion 210 that displays content (e.g., a textual message) and other information relating to the highlighted (e.g., selected) element 208a-208n. As illustrated in FIG. 2, presentation pane 210 illustrates content and other information for highlighted element 208c, corresponding to an email generated by Ben Field's. For example, presentation pane 210 illustrates the content to include a textual message 220. Presentation pane 210 further illustrates that other information may include one or more fields such as a From field 212, a To field 214, a CC field 216, a date field 218, and/or other fields. Presentation pane 210 also illustrates that other information includes a threadmap 230 with summary information 235. Threadmap 230 may illustrate whether the selected element is associated with any children element, parent elements, siblings elements, or includes other family relationships.

Threadmap 230 may provide a number of insights that a sighted user may discover for the selected message. In one exemplary embodiment, threadmap 230 may trigger events associated with an Access drop down menu 300, such as displaying menus, updating menus, or other events. Access drop down menu 300 may provide options that represent the visualization of threadmap 230.

For example, threadmap 230 may illustrate visualizations regarding ancestral relationships and whether or not the elements have been reviewed, among other features. Visualizations include all information that sighted users may discover from viewing an application interface. Visualizations include inferences, insights, and other visualizations that may be discovered from the user interface or other representation of the application interface. Information regarding the visualizations may be indicated to users using different color schemes, different graphical representations, and other distinguishing features. Threadmap 230 may illustrate that the presently selected element, illustrated as an open circle, is associated with a grandparent element, a parent element and three children elements. The user may quickly discover, based on shading patterns of elements in threadmap 230, that grandparent element and parent element have been reviewed (gray colored dots), while the three children elements (black colored dots) have not yet been reviewed. Summary information 235 may be displayed when the cursor or other pointer is placed over a selected element (i.e., dot). Summary information 235 may include features such as the time the message was received, an identifier for the sender of the message, the first sentence of the message, among other features.

Figure 3:
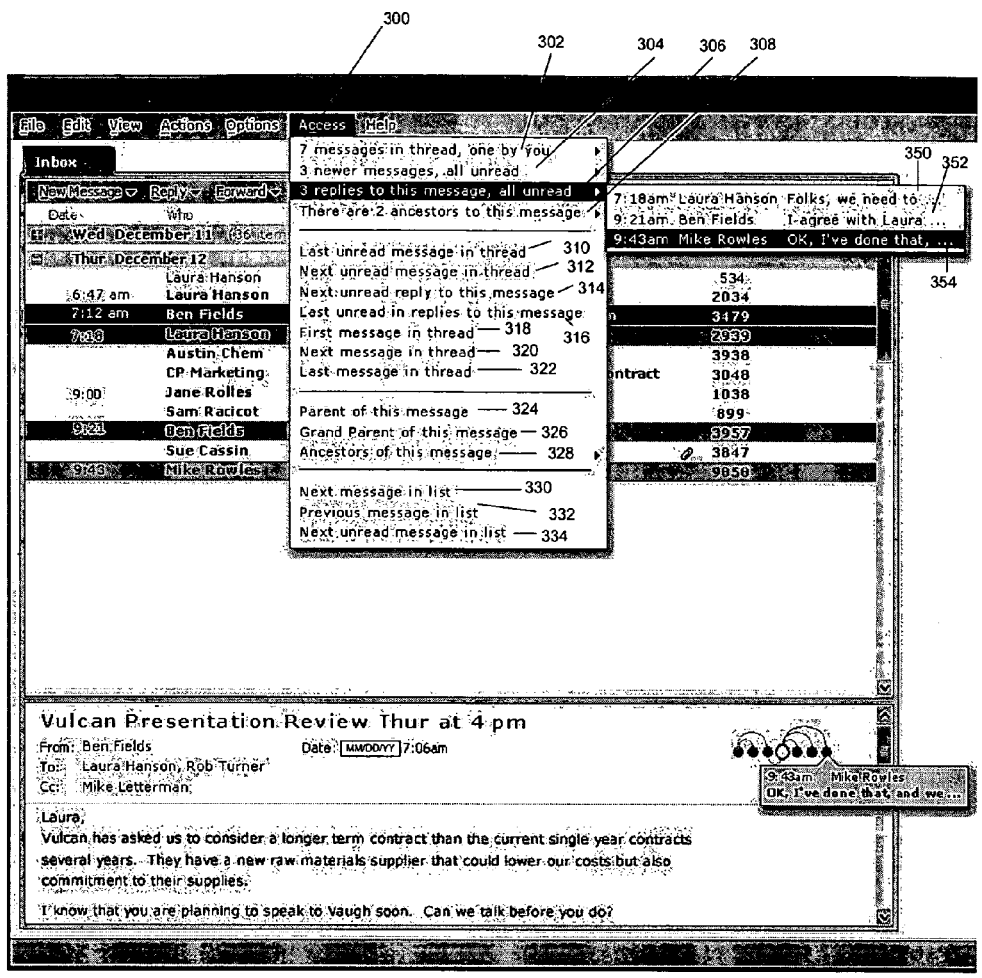
FIG. 3 illustrates another exemplary screen-shot of the application user interface according to an embodiment of the invention.

FIG. 3 illustrates an exemplary layout of client side email system GUI 200 having the Access drop down menu 300 overlaid thereon. Access drop down menu 300 may be displayed by selecting the "Access" button in toolbar 202. According to one embodiment of the invention, Access drop down menu 300 may include a hierarchical menu structure. According to another embodiment of the invention, Access drop down menu 300 may include a listing of insights associated with the visualization of the user interface.

Access drop down menu 300 may include several options 302-334 and 350-354 relating to the selected email message 208a-208n. Options 302-334 and 350-354 may be configured as textual interpretations of the visualizations associated with the elements of inbox 206. Options 302-334 and 350-354 may be dynamically generated and/or automatically updated to represent the most current visualizations associated with the elements of inbox 206.

Access drop down menu 300 may include a number of elements in a thread, including an indication of how many were created by the user 302; a number of new elements, including their status as unread 304; a number of replies to the selected element, including their status as unread 306; a number of ancestors to the selected element 308; a last unread message in a thread 310; a next unread element in a thread 312; a next unread reply to the selected element 314; a last unread reply to the selected element 316; a first element in a thread 318; a next element in a thread 320; a last element in a thread 322; a parent of the selected element 324; a grand parent of the selected element 326; ancestors of the selected element 328; a next element in a list 330; a previous element in a list 332; a next unread element in a list 334; and/or other options.

The options presented in Access drop down menu 300 may provide insights regarding underlying information for the selected elements 208a-208n. The options may include textual representations of visualizations that sighted users may infer from the application interface. For example, the options presented may indicate that there are three unread elements, that a selected element has three children and/or four peers because there were four children to the related parent. Thus, the options may indicate that the selected element has siblings and provide the status as read or unread, for example. Access drop down menu 300 may also present options that identify all elements that were received in response the selected element. Furthermore, Access drop down menu 300 may provide options for determining whether the user has reviewed all elements associated with the selected element.

Access drop down menu 300 may present a hierarchical menu of options that the user may navigate. According to one embodiment of the invention, Access drop down menu 300 may include one or more levels of options. For example, when the user selects option 306, a submenu may be presented to the user that illustrates the replies to the selected element. For example, as illustrated in FIG. 3, the submenu may include suboptions 350, 352, and 354. The suboptions may be listed by fields, such as, time of receipt, name, subject, read/unread element indicator, or other fields.

According to another embodiment of the invention, the submenu may present qualities associated with the selected element of the menu. For example, the submenu may list the children of the selected element so that the user may understand that one of the children is unread, wherein the indication that one of the children is unread may be communicated using a symbol and/or word that a screen reader may recite aloud. Additionally, the submenu may include a command that enables the user to read the unread element. As a result, each level of the menu may provide textual representations of the visualization. Furthermore, the menu may present information that may be read out loud to the user and may enable the user to navigate the menu, wherein the user may navigate the various menus and/or menu levels using a keyboard.

According to another embodiment of the invention, options presented in Access drop down menu 300 may enable users to determine which elements are related to other elements. Access drop down menu 300 may textually illustrate relationships between elements that are otherwise represented graphically through a thread. Menu options also may include attributes associated with selected elements, such as which elements may contain attachments, which elements may be unread, or other attributes.

An example of using threads for enabling communication among electronic mail and messaging users is disclosed in U.S. patent application Ser. No. 10/334,087 (Publication No. 20030163537) entitled "Method and Apparatus for Handling Conversation Threads and Message Groupings as a Single Entity,", filed Dec. 30, 2002, the entire disclosure of which is hereby incorporated herein by reference. It should be noted that the invention is not limited to any particular mechanism for determining threads among a set of documents including email messages. Other threading services may also be used as would be apparent.

Menu options 302-308 from Access drop down menu 300 provide users with textual menus for determining relationships among selected elements 208a-208n. In particular, users may select among options to determine the total number of elements in a thread, including an indication of how many of the elements were created by the user 302. The menu options also enable users to determine the number of new elements received, including their status as unread 304; the number of replies to the selected element, including their status as unread 306; or the number of ancestors to the selected element 308 and the number of replies to the selected element, including their status as unread 306.

Menu options 310-322 of Access drop down menu 300 provide users with textual menus for sequentially selecting elements based on a defined relationship among the elements. For example, users may select the last unread element in a thread 310, the next unread element in a thread 312, the next unread reply to the selected element 314, the last unread reply to the selected element 316, the first element in a thread 318, the next element in a thread 320, or the a last element in a thread 322.

Menu options 324-328 of Access drop down menu 300 provide users with textual menus for viewing elements that are related to the selected elements. For example, users may select a parent of an element 324, a grand parent of an element 326, or ancestors of an element 328.

Menu options 330-334 of Access drop down menu 300 enable users to sequentially select elements based on a specified order in which the elements were received. For example, users may select the next element in a list 330, the previous element in a list 332; a next unread element in a list 334, based on time of receipt, author, or other criteria.

The invention provides users with an ability to view and navigate menus derived from visualizations, wherein the menus include representations of relationships between elements. Viewing elements based on relationships enables compressing the time associated with when the element was created and/or received. As a result, elements that were created and/or received months apart may be illustrated together even if hundreds of non-related elements were received during the same time period. For example, elements that may be related based on topic, sender, or other relationship, may be overlooked if the user waits several days, weeks, months, or any other amount of time, between checking receipt of the elements, because a large volume of elements may have been received during this time.

In threaded representations of elements, consecutively positioned elements may attain their position from being received next in time or based on sharing a particular relationship. For the case where the elements are positioned consecutively based on sharing a particular relationship, these elements may otherwise have been separated by ten elements if the listing was based on time of receipt. According to one embodiment of the invention, a menu system is provided for displaying threaded representations using textual menus. The invention enables users to navigate elements based on time sequence and/or relationship sequence (e.g., parent, child, grandchild, etc.). Additionally, users may navigate elements based on attribute states, such as next unread, those with attachments, among other attribute states.

In one aspect of the invention, the system may concurrently display the visualization and the menu system. The menu system may provide many of the insights of the visualization, as well as some of the navigational conveniences available via the pointing device. The structure of the menu may include options for displaying key insights of the visualization, such as, current node selected in thread, the total number of element in the thread, and if any of the elements are unread and newer than the current element, the number of children associated with the selected element and if any are unread, among other options. The menu options may be made available to the screen reader. Furthermore, the structure of the menu may provide navigation options that enable use of pointers, such as, next unread element that is a child or grandchild of the current element, select the parent of the current element, select the most recent element in thread, and other options.

Figure 4:
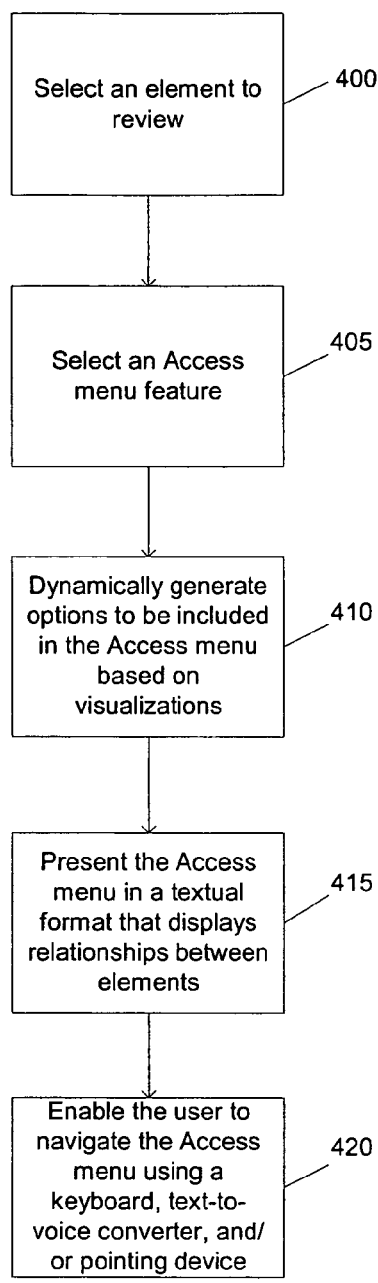
FIG. 4 illustrates a flow chart schematic of the menu generating feature according to an embodiment of the invention.

FIG. 4 illustrates a flow diagram of a generalized method for implementing the menu generating feature. In operation 400, the user may select an element to review. In operation 405, the user may initiate the menu generating feature using a menu item, toolbar button, a shortcut key, or other selector. In operation 410, the options to be included in the Access drop down menu 300 may be dynamically generated based on visualizations. In operation 415, the dynamically generated Access drop down menu 300 may be presented to the user in a format that displays the relationships. The dynamically generated Access drop down menu 300 may be concurrently displayed with the visualization that is associated with the application interface. In operation 420, the user may navigate the Access drop down menu 300 using a keyboard, a text to voice converter, a pointing device or other selecting device.

While the preferred forms of the invention have been disclosed, it will be apparent to those skilled in the art that various changes and modifications may be made that will achieve some of the advantages of the invention without departing from the spirit and scope of the invention. It will be apparent to those reasonably skilled in the art that other components performing the same function may be suitably substituted. Further, the methods of the invention may be achieved in either all software implementations, using the appropriate processor instructions, or in hybrid implementations that utilize a combination of hardware logic and software logic to achieve the same results. Therefore, the scope of the invention is to be determined solely by the appended claims.

What is claimed is:

1. A system configured to present at least one menu having options that enable representations of visualizations associated with a computer application, the system comprising:
   an electronic display;
   one or more processors configured to execute one or more computer program modules, the one or more computer program modules being configured to:
      present to a user via the electronic display a list of electronic messages received by the user,
      receive selection from the user of one of the electronic messages included in the list of electronic messages;
      determine, from criteria associated with the selected electronic message, one or more relationships between the selected electronic message and the list of electronic messages; and
      responsive, at least in part, to reception of the selection of the selected electronic message from the user, concurrently present to the user on the electronic display with the list of electronic messages, a menu that is separate from the list of electronic messages and displays selectable commands that each comprise a corresponding descriptively identified generic relationship between the selected electronic message and another electronic message in the list of electronic messages,
      wherein a given one of the descriptively identified generic relationships is selectable in order to operate the command it corresponds to;
      the commands being associated with the electronic messages determined to have the relationships to the selected electronic message that are generically identified by the displayed commands such that operation by the user of one of the commands results in the opening of the electronic message determined to have the relationship with the selected electronic message that is generically identified by the selected one of the displayed commands.

2. The system of claim 1, wherein the electronic messages include text messages.

3. The system of claim 2, wherein the electronic messages include email messages.

4. The system of claim 1, wherein the menu is a textual menu.

5. The system of claim 1, further comprising enabling the user to navigate the list of electronic messages based on at least one of a time sequence and a relationship sequence.

6. The system of claim 1, wherein the generically identified relationships comprise one or both of a next message in thread relationship and a previous message in thread relationship.

7. The system of claim 1, further comprising enabling the user to navigate the one or more menus using at least one of a keyboard, a text-to-voice converter, and a pointing device.

8. The system of claim 1, wherein the menu includes two or more levels of options.

9. A system for presenting at least one menu having options that enable representations of visualizations associated with a computer application, the system comprising:
   means for presenting to a user via an electronic display a list of electronic messages received by the user,
   means for receiving selection from the user of one of the electronic messages included in the list of electronic messages;
   means for determining, from criteria associated with the selected electronic message, one or more relationships between the selected electronic message and the list of electronic messages; and
   means for presenting, the means for presenting being configured such that responsive, at least in part, to reception of the selection of the selected electronic message from the user, a menu that is separate from the list of electronic messages is concurrently presented to the user on the electronic display with the list of electronic messages and displays selectable commands that each comprise a corresponding descriptively identified generic relationship between the selected electronic message and another electronic message in the list of electronic messages,
      wherein a given one of the descriptively identified generic relationships is selectable in order to operate the command it corresponds to;
      the commands being associated with the electronic messages determined to have the relationships to the selected electronic message that are generically identified by the displayed commands such that operation by the user of one of the commands results in the opening of the electronic message determined to have the relationship with the selected electronic message that is generically identified by the selected one of the displayed commands.

10. The system of claim 9, wherein the electronic messages include text messages.

11. The system of claim 10, wherein the electronic messages include email messages.

12. The system of claim 9, wherein the menu is a textual menu.

13. The system of claim 9, further comprising means for enabling the user to navigate the list of electronic messages based on at least one of a time sequence and a relationship sequence.

14. The system of claim 9, wherein the generically identified relationships comprise one or both of a next message in thread relationship and a previous message in thread relationship.

15. The system of claim 9, further comprising means for enabling the user to navigate the one or more menus using at least one of a keyboard, a text-to-voice converter, and a pointing device.

16. The system of claim 9, wherein the menu includes two or more levels of options.

* * * * *